United States Patent [19]
Thompson et al.

[11] Patent Number: 5,454,165
[45] Date of Patent: Oct. 3, 1995

[54] HAND-HELD TOOL WITH HOLLOW HANDLE

[75] Inventors: Alex Thompson, Manhattan Beach; William E. Gagner, Corona, both of Calif.

[73] Assignee: Harrow Products, Inc., Grand Rapids, Mich.

[21] Appl. No.: 179,310

[22] Filed: Jan. 10, 1994

[51] Int. Cl.$^6$ ................................................ B26B 13/00
[52] U.S. Cl. .......................... 30/249; 30/340; 403/370; 403/371; 403/378
[58] Field of Search ........................... 30/340, 341, 249, 30/254; 403/366, 369, 370, 371, 374, 378, 409.1; 279/102

[56] References Cited

U.S. PATENT DOCUMENTS

| | | | |
|---|---|---|---|
| 999,703 | 8/1911 | Cronk | 30/341 |
| 3,466,772 | 5/1967 | Phillips. | |
| 3,722,903 | 3/1973 | Jones | 403/371 |
| 3,854,768 | 12/1974 | King, Sr. | 403/371 |
| 4,304,502 | 12/1981 | Stratienko | 403/370 |
| 4,809,433 | 3/1989 | Maxwell et al. . | |
| 5,058,277 | 10/1991 | Kishimoto | 30/249 |

*Primary Examiner*—Hwei Siu Payer
*Attorney, Agent, or Firm*—Price, Gess & Ubell

[57] ABSTRACT

A lightweight renewable hand-held tool that may be easily renewed in the field including a tool head having a tapered shaft, an expandable sleeve, a hollow handle, and a movement assembly for moving the expandable sleeve back and forth along the tapered shaft in response to a rotation of the hollow handle. The expandable sleeve includes a tapered interior that slidably mates with the tapered shaft. Consequently, rotation of the hollow handle adjustably expands the expandable sleeve, forming a tight fit between the tapered shaft and the interior of the hollow handle. The preferred movement assembly is a threaded nut that engages a threaded stud located at a lower end of the tapered shaft. An antirotation fastener is preferably used to prevent the hollow handle from thereafter rotating during use of the tool.

19 Claims, 6 Drawing Sheets

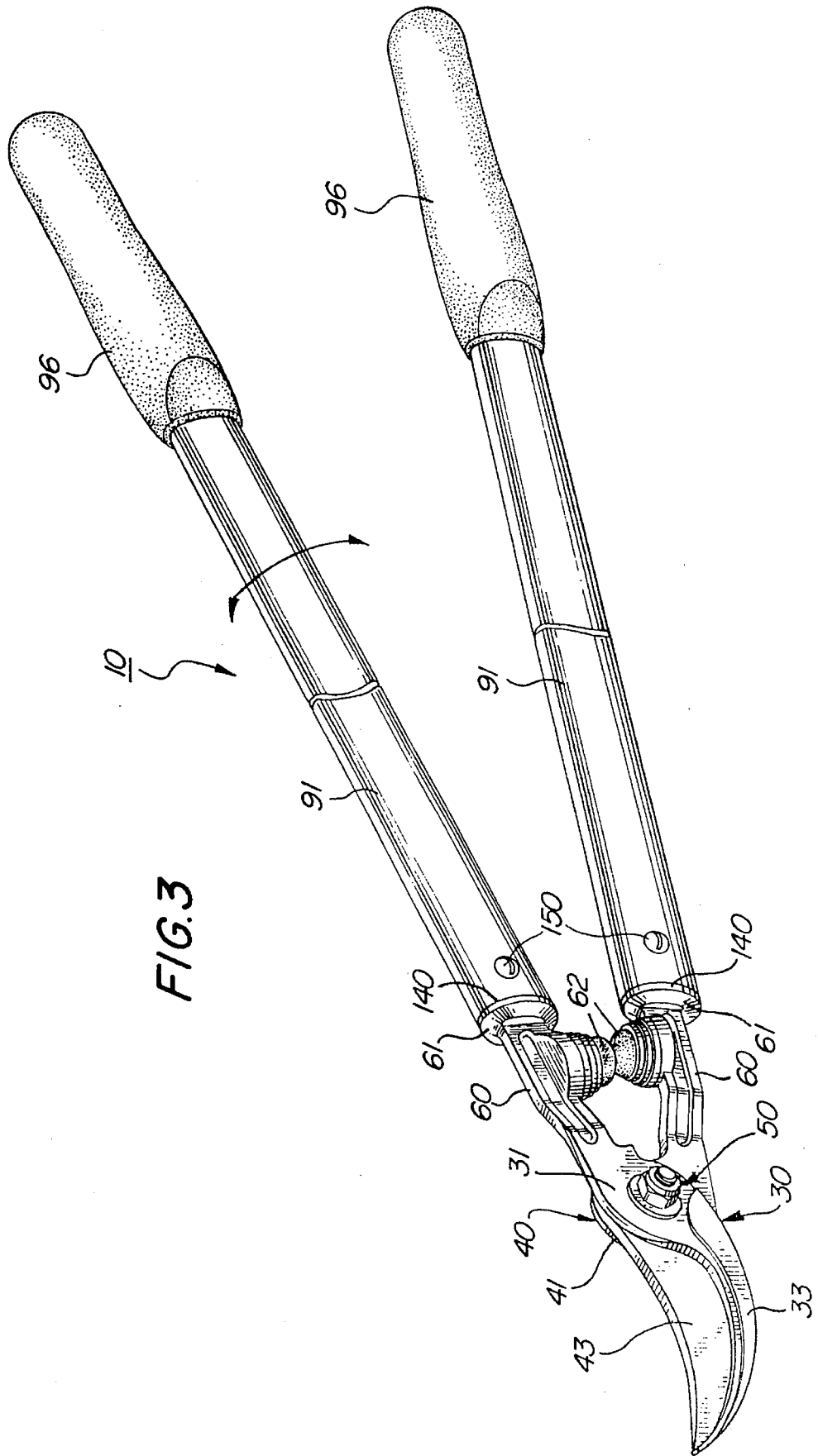

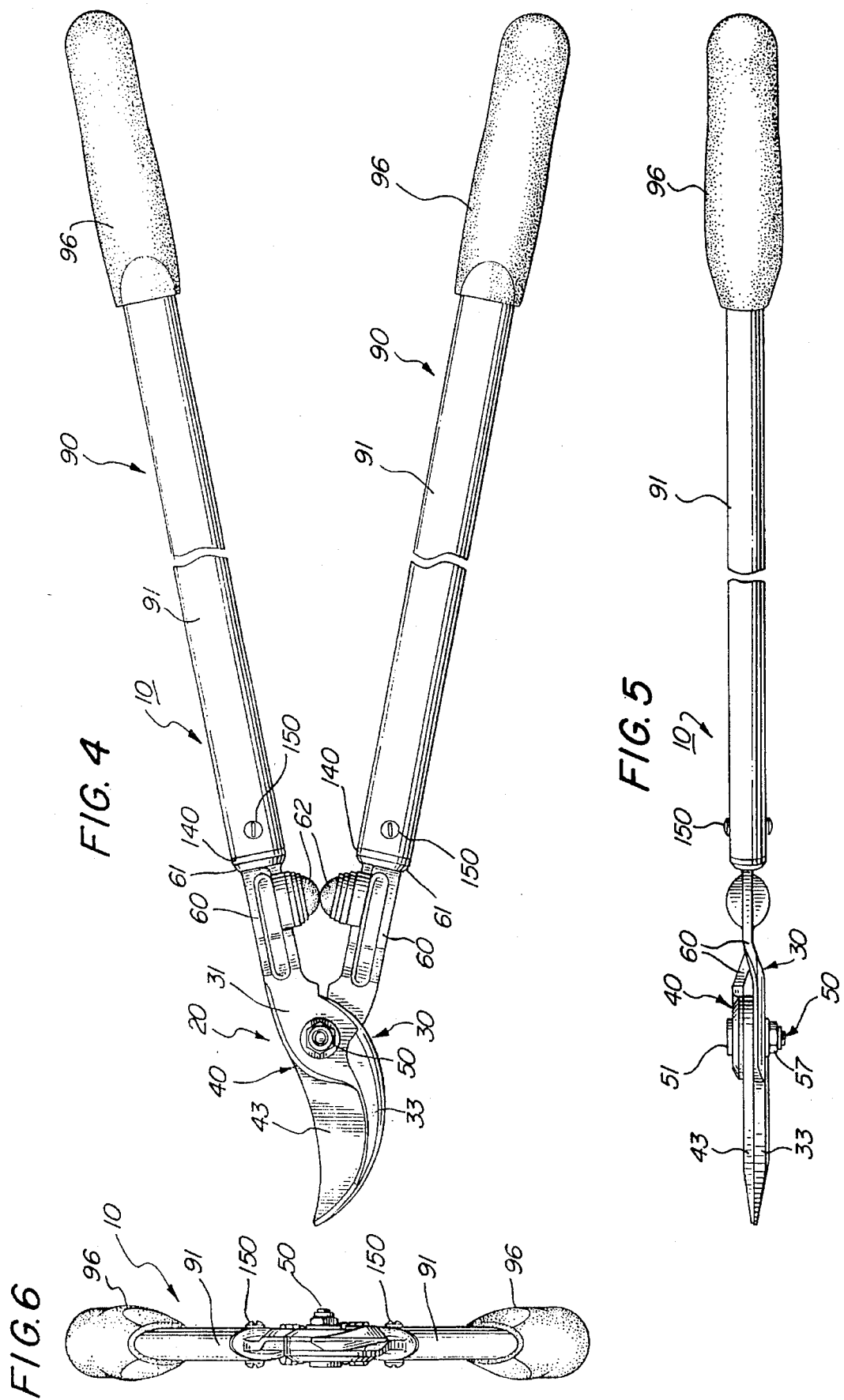

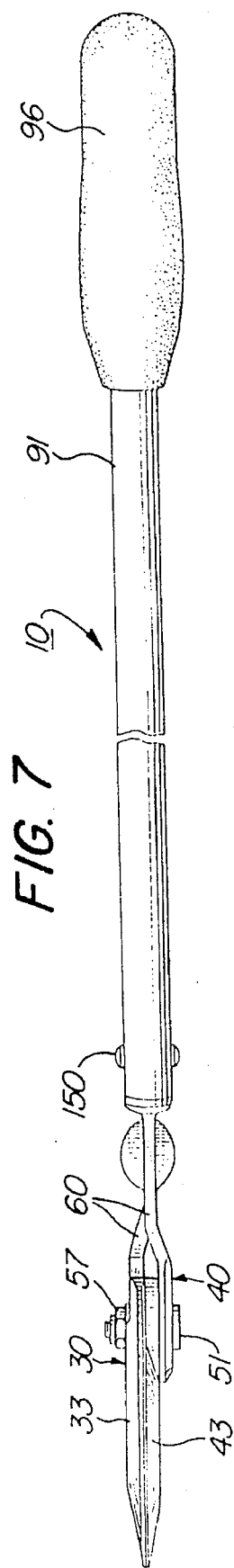
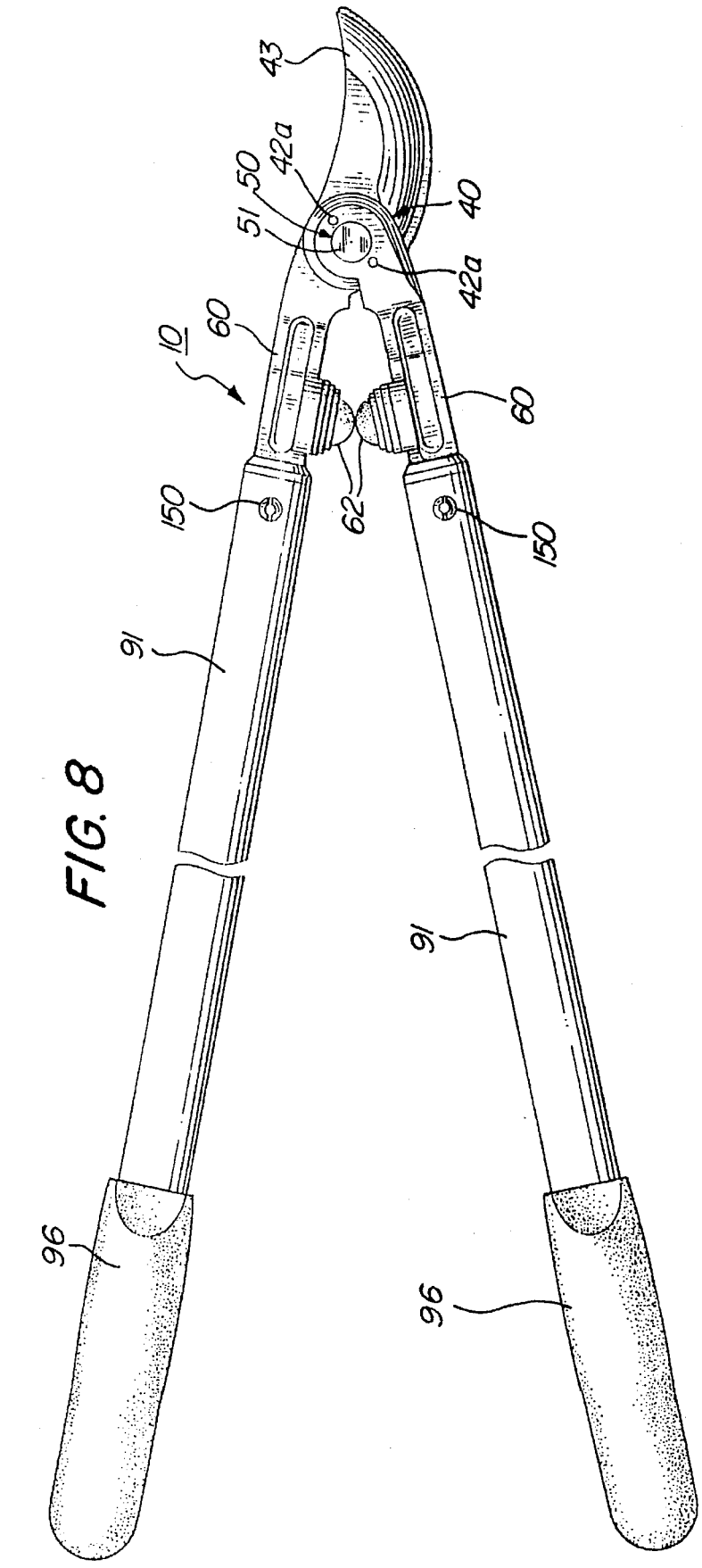
FIG. 7
FIG. 8

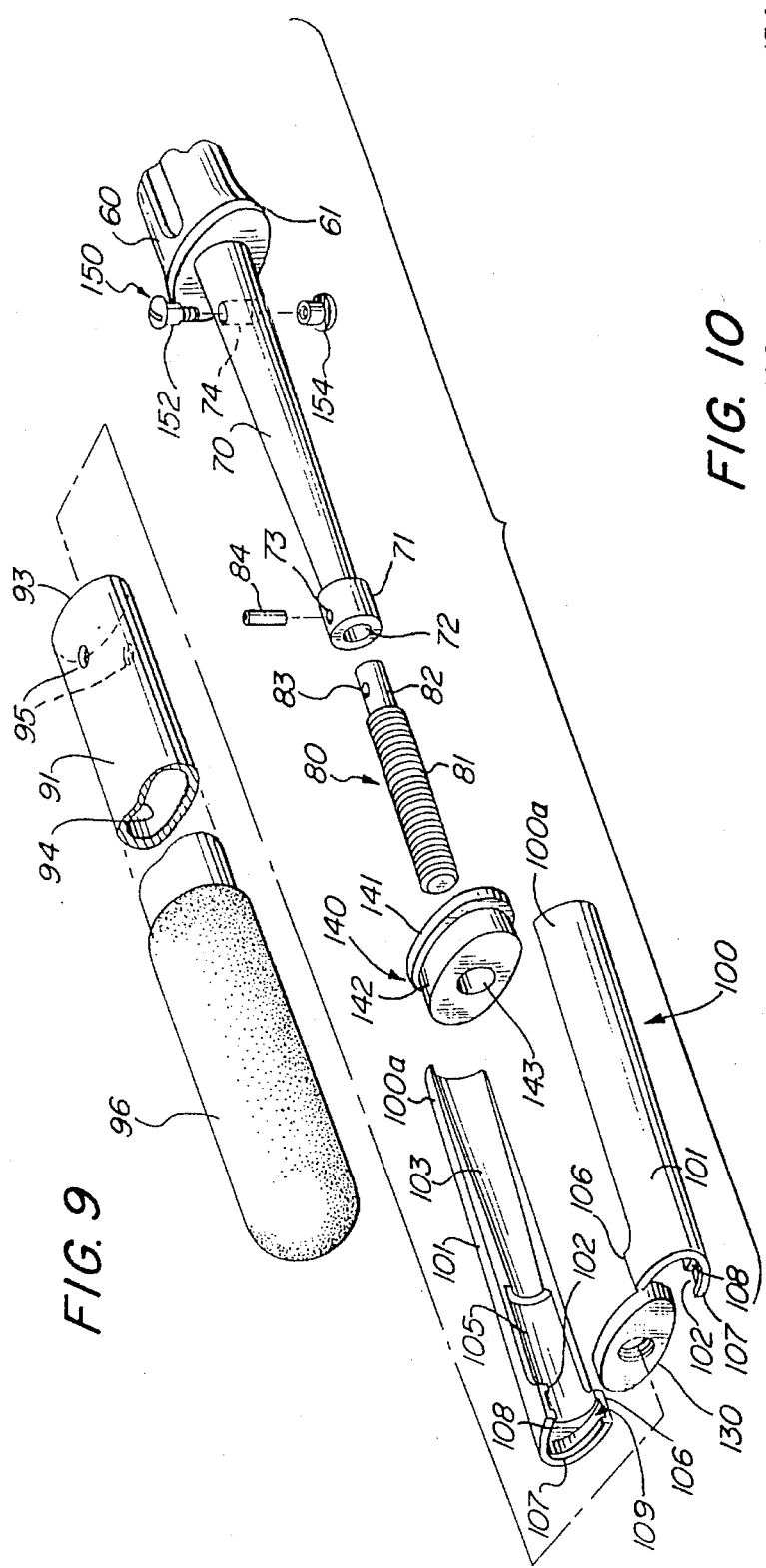
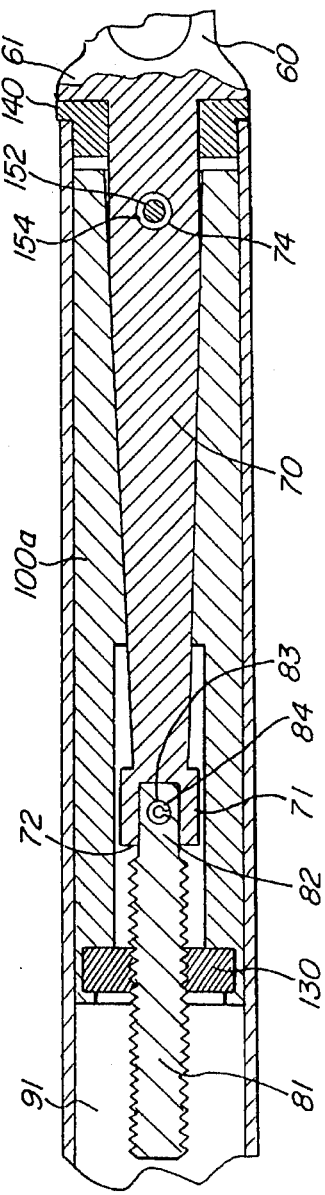
FIG. 9
FIG. 10

HAND-HELD TOOL WITH HOLLOW HANDLE

BACKGROUND OF THE INVENTION

1. Field of the Invention

The present invention relates generally to hand-held tools and, in particular, to hand-held pruning tools.

2. Description of Related Art

Hand-held tools known as pruning tools are used to cut the branches, stems, and stalks of plants to control their growth, enhance their appearance, and harvest their products. Pruning tools typically have a scissors-like cutting head attached to one or two handles. A lopping shear, sometimes called a lopper, is an example of a pruning tool with two relatively large handles. A pole pruner is an example of a pruning tool with only one handle.

The cutting head is usually metal. The handles are made of various materials, including fiberglass, metal, wood, etc. The handles may be solid. However, hollow handles are often preferred because of reduced weight.

A hollow handle must, of course, be securely attached to the cutting head in some manner. A common problem is providing a solid, durable connection between the cutting head and the hollow handle. This is especially true where the pruning tool is used to sever large branches and undergoes excessive strain or where the pruning tool is continually used in a commercial environment, such as, for example, harvesting grapes.

FIG. 1 illustrates one prior art approach to attaching a hollow handle 200 to a leg 212 of a cutting head 210. As shown, this prior art system employs a hard rubber ferrule 220 having a central body portion 222 and an external skirt 224 which defines a tubular space 226 for receiving an end of the hollow handle 200. When so received, the central body portion 222 fits tightly inside of the hollow handle 200 and the external skirt 224 fits tightly around the hollow handle 200. A central aperture 223 is defined in the central body portion 222 to receive the leg 212 of the cutting head 210. An interconnection between the hollow handle 200 and the cutting head 210 is made secure with a pair of pins 230 inserted through a pair of aligned apertures respectively formed through the ferrule 220, the hollow handle 200, and the leg 212 of the cutting head 210.

FIG. 2 illustrates another prior art approach involving a hollow handle 300 and a ferrule 320 of a different construction. Here, the cutting head 310 has a leg 312 with a width "W" that is slightly larger than the inside diameter of the hollow handle 300. The ferrule 320 has an upper cap portion 321 and an elongated body portion 322. A rectangular aperture 323, conforming to the cross-sectional shape of the cutting head leg 312, extends though the ferrule's cap portion 321 and elongated body portion 322. Four elongated ribs 324 are provided along the exterior of the elongated body portion 322 to provide an X-shaped cross-section. The four elongated ribs 324 are dimensioned so that they fit snugly within the interior of the hollow handle 300. An upper portion 325 of two opposing ribs 324 are open so that an edge of the leg 312 can make direct, metal-to-metal contact with the interior of the hollow handle 300. The metal-to-metal contact between the leg 312 and the hollow handle 300 in one dimension, in conjunction with the close fit between the ferrule 320 and the hollow handle 300 in two dimensions, provides an overall tight fit.

The tool head to handle connections of FIGS. 1 and 2 work relatively well for their designed purpose. However, to ensure a solid assembly, they both require tight control over component size variation during manufacture. If production results in size variation, the result may be an overly tight "line to line" fit or an overly sloppy fit. This is especially true if the cutting head, or components, are made of cast metal that have a relatively wide production range in terms of dimension. In addition, the hollow handles are likely to be purchased from outside sources. Consequently, dimensional variation of the handle may not be under the direct control of the pruning tool manufacturer.

Moreover, a connection according to either FIG. 1 or FIG. 2 is not readily renewable in the field. This is particularly problematic where the tool is being used in a commercial environment, where down time is money lost. The prior art tools do not generally provide for quick and easy replacement of the handle or tool head if accidentally damaged.

OBJECTS AND SUMMARY OF THE INVENTION

It is an object of the present invention to provide a cost efficient, lightweight hand-held tool, such as a pruning tool, having a hollow handle;

It is a further object of the present invention to provide a pruning tool having a solid connection between its cutting head and a hollow handle;

It is a further object of the present invention to provide a pruning tool with a solid connection between its cutting head and a hollow handle where the handle may, nonetheless, be quickly and easily replaced in the field;

It is a further object of the present invention to provide a pruning tool having an improved pivot connection to reduce wear and provide ease of use; and It is a further object of the present invention to provide a pruning tool having an improved cutting operation.

The present invention achieves the above objects, and others, by providing a hand-held tool comprising a tool head with a tapered shaft; an expandable sleeve with a through hole having a tapered interior, said expandable sleeve slidably surrounding the tapered shaft with a larger end of the expandable sleeve's tapered interior facing a larger end of the tapered shaft; a hollow handle rotatably surrounding said expandable sleeve; and means for moving said expandable sleeve along the tapered shaft in response to a rotation of said hollow handle to expand said expandable sleeve between the shaft and said hollow handle to form a tight fit.

Another embodiment of the present invention provides a hand-held pruning tool comprising a first rotatable cutting member having a first central portion, a first planar cutting surface, and a round aperture having a spherical counterbore extending perpendicularly through the first central portion; a second rotatable cutting member having a second central portion which rotatably mates with the first central portion, a second planar cutting surface which slidably mates with the first planar cutting surface, and a nonround aperture extending perpendicularly through the second central portion; and a pivot bolt including a nonround shank passing perpendicularly through the round and nonround apertures and dimensioned to rotate freely within the round aperture and to engage the nonround aperture, and a head with a spherical underside that engages the spherical counterbore, the first rotatable cutting member rotating between the spherical head of the pivot bolt and the second planar cutting surface of the second rotatable cutting member, and not on the shaft of the pivot bolt, thereby maintaining planar contact between the first and second planar cutting surfaces during rotation.

The features of the present invention which are believed to be to novel are set forth with particularity in the appended claims. The present invention, both as to its organization and manner of operation, together with further objects and advantages thereof, maybe be best understood by referring to the following description in conjunction with the drawings.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 3 is a perspective view of a pruning tool known as a lopping shear according to the present invention;

FIG. 4 is a left side elevational view of the pruning tool of FIG. 3;

FIG. 5 is a top plan view of the pruning tool of FIG. 3;

FIG. 6 is a front elevational view of the pruning tool of FIG. 3;

FIG. 7 is a bottom plan view of the pruning tool of FIG. 3;

FIG. 8 is a right side elevational view of the pruning tool of FIG. 3;

FIG. 9 is an exploded perspective view of the lower handle portion of the pruning tool, as oriented in FIG. 8, showing an internal interconnection assembly for attaching the handle to the cutting head;

FIG. 10 is a partial cutaway view showing a completed assembly of the exploded components of FIG. 9;

DETAILED DESCRIPTION OF THE PREFERRED EMBODIMENTS

Figures 1, 2:
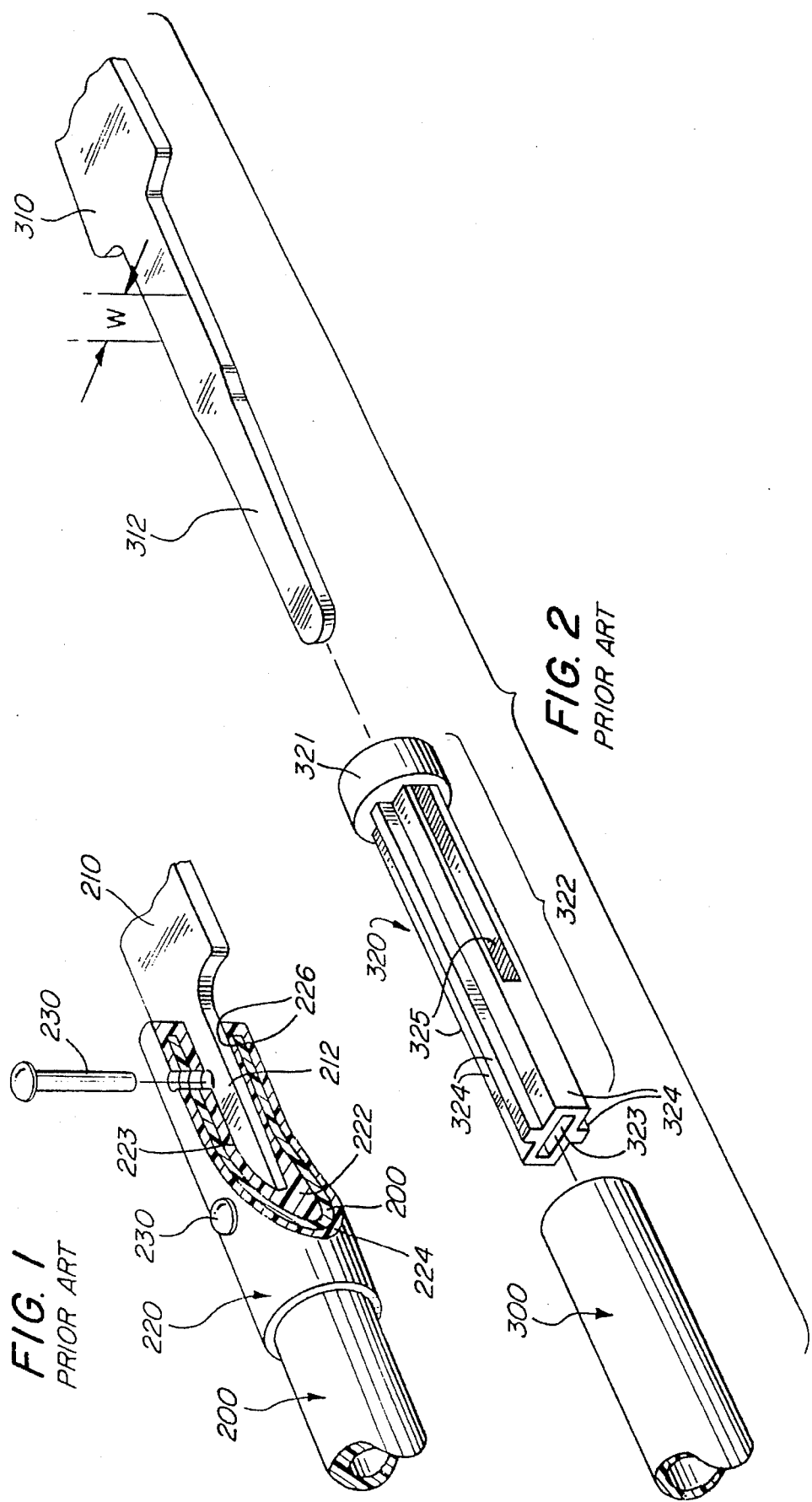
FIG. 1 is a cutaway perspective view of a first prior art pruning tool, showing the construction and interconnection between a hollow handle, a ferrule, and a leg of a cutting head.
FIG. 2 is a exploded perspective view of a second prior art pruning tool, showing the construction and intended interconnection between a hollow handle, a ferrule, and a leg of a cutting head.

The following description is provided to enable any person skilled in the art of manufacturing pruning tools to make and use the invention and sets forth the best mode contemplated by the inventor for carrying out the invention. However, various modifications will remain readily apparent to those skilled in these arts, since the generic principles of the present invention have been defined herein specifically to provide an economical and practical pruning tool.

FIGS. 3–8 are various view of a pruning tool 10 constructed according to the present invention. The particular pruning tool shown is a lopping shear, or lopper. However, the present invention is applicable to all types of hand tools.

Focusing first on FIG. 3, one sees that a lopping shear 10 is generally comprised of a cutting head 20 and two handle assemblies 90. Other hand tools, such as a pole pruner (not shown), may have only one handle assembly.

The cutting head 20 for a lopping shear preferably includes a hook member 30 and a blade member 40, both preferably being formed, at least in part, of cast or forged metal. The hook member 30 has a cutting end 33 and a leg end 60 on opposite sides of a central portion 31. In similar fashion, the blade member 40 has a cutting end 43 and a virtually identical leg end 60 on opposite sides of a central portion 41. A pair of bumpers 62, 62 are fastened on the opposing inner sides of the respective leg ends 60, 60, in a known manner, to act as a cushion during pruning.

The central portions 31, 41 of the hook and blade members 30, 40 are pivotally attached to one another with a pivot bolt assembly 50, as further described below. The leg ends 60, 60 are also respectively attached to the handle assemblies 90, 90, as further described below. By moving the handle assemblies 90, 90, the user simultaneously moves the hook and blade member 30, 40 about the pivot bolt assembly 50 extending through their respective central portion 31, 41, in a scissors-like fashion.

The hook member 30 earns its name because of the general "hook" shape of its cutting end 33. The hook member 30 is used to hook a plant stem before cutting. The cutting end 43 of the blade member 40 is then pivoted through the stem toward the hook member 30, thereby severing the stem.

As shown in FIG. 3, each handle assembly 90 is comprised of a hollow handle 91 with a hand grip 96 pressed onto one end. The hollow handle 91 may be comprised of various material such as extruded aluminum, fiberglass, steel, etc. As best shown in FIG. 9, the hollow handle 91 includes an end 93, on the side opposite the hand grip 96, that leads to an interior 94. The interior 94 will physically engage components located within the hollow handle 91 so that the components rotate with the handle 91. Accordingly, the interior 94 is preferably of a nonround shape such as the elliptical shape shown in FIG. 9. However, some other means for engagement, such as a separate fastener, may be provided even with a round handle.

The interconnection between a leg end 60 and a hollow handle 91 is best understood with continued reference to FIG. 9. As shown, going from right to left and bottom to top, the interconnection involves a tapered shaft 70, a threaded stud 80, a ferrule 140, an expandable sleeve or wedge assembly 100, and a wedge nut 130.

The interconnection works as follows. The tapered shaft 70 and the threaded stud 80 extend from the leg end 60 of the cutting head 20. The leg end 60 preferably includes a flange 61 which has an outside periphery conforming with the periphery of the ferrule 140 and the periphery of the hollow handle 91 to provide a smooth external interface as shown, for example, in FIG. 3.

The tapered shaft 70 is preferably an integral "as-cast" part of the cutting head 20. The threaded stud 80 can be machined into an integral "as-cast" extension of the tapered shaft 70. However, as shown in FIG. 9, the threaded stud 80 is preferably separable, being comprised of a threaded portion 81 and a smooth engagement portion 82 having a transverse aperture 83. The tapered shaft 70 is provided with an enlarged boss 71 having an end aperture 72 for receiving the smooth engagement portion 82. A pair of opposed holes 73, 73 on opposite sides of the boss 71 align with the aperture 83 when the threaded stud 80 is connected to the tapered shaft 70. A pin 84 is inserted through the holes 73, 73 and the aperture 83 to secure the stud 80 to the shaft 70. The preferred pin 84 is a roll pin, although any similar fastener would suffice.

The ferrule 140 includes an upper portion 141, a smaller lower portion 142, and an aperture 143. The aperture 143 must be large enough to slide over the threaded stud 80 and the tapered shaft 70 to rest against the flange 61 (see FIG. 10). The larger upper portion 141 preferably has an outside periphery which, as described above, matches that of the flange 61 for aesthetic reasons. The outside periphery of the smaller lower portion 142 should closely match the interior 94 of the hollow handle 91 in order to fit in and hold the end 93 of the handle 91. The ferrule 140 does not fully support the hollow handle 91 and is not absolutely necessary. However, the ferrule 140 is preferably employed because it helps prevent the hollow handle 91 from rocking or "working" about some natural pivot point located at some distance from the ferrule 140.

The preferred wedge assembly 100 is, as shown in FIG. 9, comprised of two identical halves 100a, 100a. The halves 100a, 100a are preferably formed of nylon, but may be formed from most any material. The halves 100a, 100a are preferably connected to one another with cooperating pairs of tabs 106, 106, and opposed slots 102, 102. The two halves 100a, 100a of the wedge assembly 100 collectively provide an outside periphery 101, 101 that is initially slightly smaller than the interior 94 of the hollow handle 91.

The entire wedge assembly 100 slides over the threaded stud 80 and onto the tapered shaft 70. The wedge assembly 100 includes a tapered interior 103 that slidably engages the tapered shaft 70 so that the outside periphery 101 of the wedge assembly 100 is adjustably expandable. The degree of expansion depends on the relative position between the tapered interior 103 of the wedge assembly 100 and the tapered shaft 70.

The preferred wedge assembly 100 includes a lower expanded interior 105 to accommodate the boss 71 at the end of the tapered shaft 70. When sliding the wedge assembly 100 onto the tapered shaft 70, it may be necessary to spread the two halves 100a, 100a slightly apart to get the boss 71 past the narrowest portion of the tapered interior 103 and into the expanded interior 105.

A wedge nut 130 is provided to engage the threaded stud 80. When tightened, the wedge nut 130 pushes the wedge assembly 100 upwardly along the tapered shaft 70, thereby expanding its periphery 101. The wedge nut 130 can be completely separate from the wedge assembly 100. However, as shown in FIG. 8, the wedge nut 130 is preferably captured in a nut chamber 109 at one end of the wedge assembly 100. The nut chamber 109 is defined by a wall 108 at one end of the expanded interior 105, by a portion of the periphery 101, and finally by a rim 107 extending perpendicularly from the periphery 101.

The wedge member's nut chamber 109 beneficially captures the wedge nut 130 so that rotation of the wedge nut 130 in one direction will push the wedge member 100 upward on the tapered shaft 70 and rotation of the wedge nut 130 in the other direction will pull the wedge member 100 downward on the tapered shaft 70. In this manner, as suggested by the rotational arrows of FIG. 3, the hollow handle 91 can be rotated one way to affirmatively expand and the other way to affirmatively contract the wedge member 100. The invention, therefore, provides both easy assembly and easy disassembly.

During installation, the wedge member 100 is slid onto the threaded stud 80 and the tapered shaft 70 until the threaded stud 81 engages the captured wedge nut 130. Then, the hollow handle 91 is slid over all of the above components, preferably all the way until the upper portion of the ferrule 141 is sandwiched between its end 93 and the flange 61. Assuming right hand threads, the hollow handle 91 is then rotated clockwise, along with the wedge nut 130 and the wedge member 100, thereby causing the wedge nut 130 to ride up on the threaded stud 81, expanding the wedge member 100 against the interior 94 of the hollow handle 91. After the wedge member 100 has expanded to provide a very tight fit, the hollow handle 91 is further rotated to align a pair of apertures 95 in the hollow handle with a transverse aperture 74 through the tapered shaft 70.

An antirotation fastener 150 is finally installed to prevent the hollow handle 91 from rotating during use and thereby loosing the wedge nut 130 and the wedge member 100. The antirotation fastener 150 is installed through the apertures 95 in the hollow handle and the aperture 74 through the tapered shaft 70. The preferred antirotation fastener 150 is comprised of a shoulder screw 152 and a barrel nut 154. FIG. 10 is a cross-section showing the assembled interconnection of the hollow handle 91 and the leg end 60, including the wedge nut 130, the wedge assembly 100, the threaded stud 80, and the tapered shaft 70.

Figure 11:
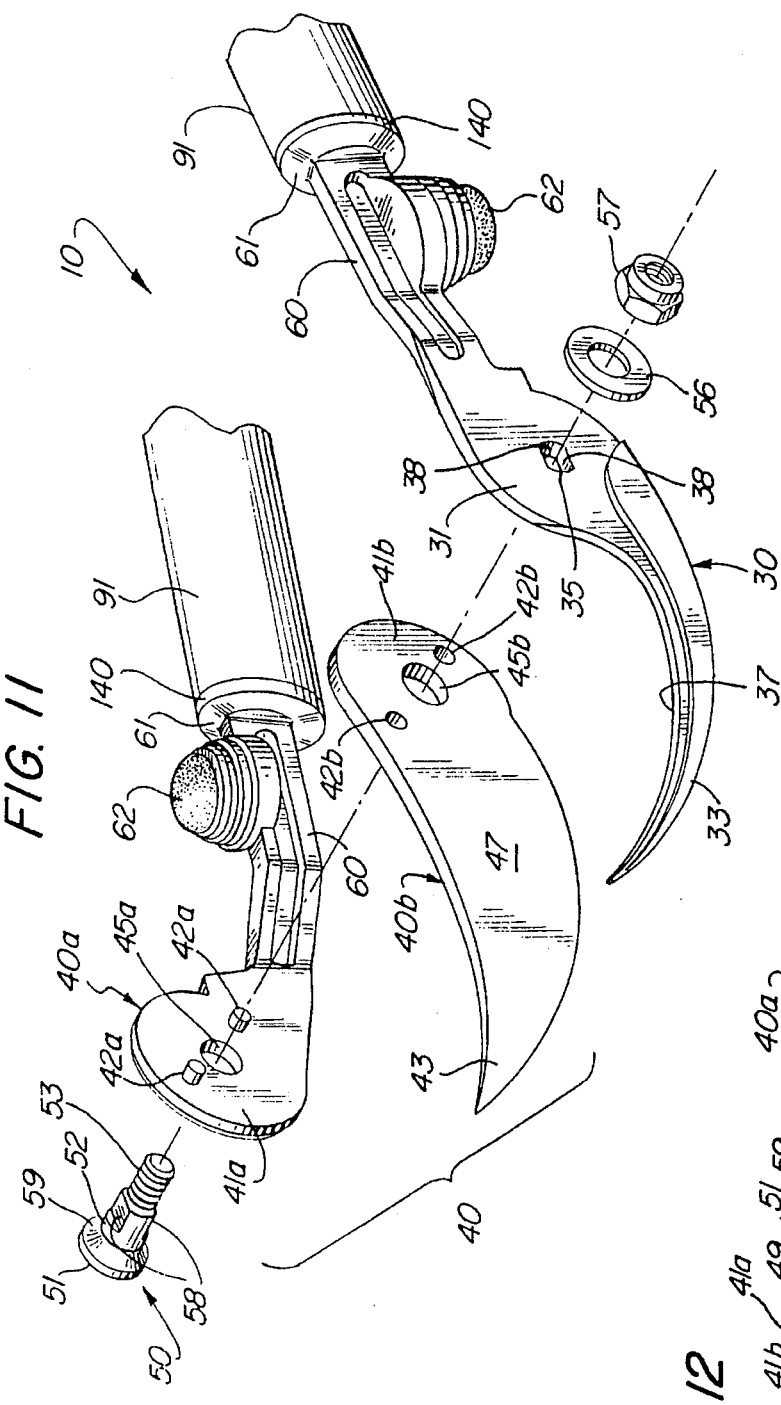
FIG. 11 is an exploded perspective view illustrating a preferred pivot bolt assembly for use with the pruning tool of FIG. 3.
Figure 12:
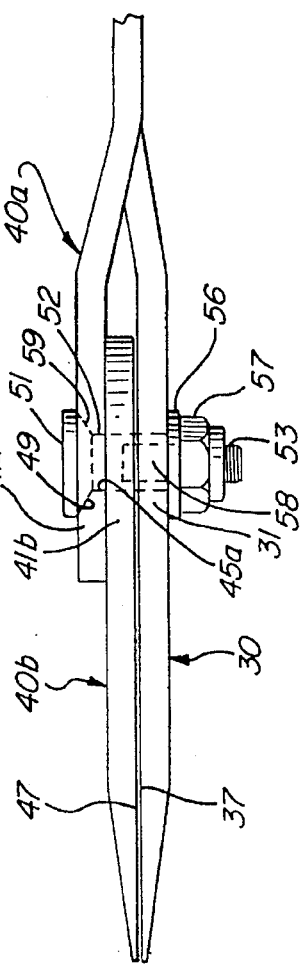
FIG. 12 is partially hidden side view showing the pivot bolt assembly of FIG. 11, as assembled.

FIGS. 11 and 12 illustrate a preferred pivot bolt assembly 50 for a pruning tool 10 according to the present invention. As shown, the hook and blade members 30, 40 each have a planar cutting surface 37, 47. The planar cutting surfaces 37, 47 must be very closely aligned at all times in order to achieve a good cutting action. Planar alignment has been difficult to achieve and maintain with many prior art pruning tools because of deficiencies in the pivot bolt assembly. In particular, the prior art pruning tools typically employ a standard flat head pivot bolt and both the blade member and hook member typically rotate directly on the shaft of the bolt. Consequently, the apertures wear and, worse, mechanical tension results if the rotation apertures are not exactly perpendicular to the planar cutting surfaces 37, 47. The result is a sloppy fit and a hard cut.

A pivot bolt assembly 50 according to the present invention overcomes such problems. As shown, the preferred blade member 40 is a two-piece assembly comprised of a handle component 40a and a blade component 40b. A separable blade component 40b is preferred so that it can be made from a method other than forging, such as stamping from flat sheet metal, to be thinner, sharper, and easily replaced. The present invention would, however, work equally well with a one-piece blade member 40 (not shown).

The handle and blade components 40a, 40b each have a central portion 41a, 41b. An outer one of the central portions 41a is interlocked to an inner one of the central portions 41b with a cooperating pair of pins 42a, 42a and spaced apertures 42b, 42b. When so interlocked, a pair of apertures 45a, 45b in the central portions 41a, 41b are aligned. The hook member 30 also has an aperture 35 in its central portion 31 that aligns with the apertures 45a, 45b.

As discussed earlier, the central portions 31, 41 of the hook and blade members 30, 40 are pivotally attached to one another by a pivot bolt assembly 50. The pivot bolt assembly 50 is comprised of a pivot bolt 51 and a nut 57. The pivot bolt 51 has a spherical head 59, a flatted shank 52 with opposed flats 58, 58, and a threaded end 53. The pivot bolt 51 is received by the nut 57 after extending through the apertures 45a, 45b, and 35 in the hook and blade members 30, 40. A washer 56 may be used adjacent the nut 57, if desired.

As best shown in FIG. 12, the outer aperture 45a includes a spherical counterbore 49. When installed, the pivot bolt's spherical head 59 rotatably engages the spherical counterbore 49 of the hook member's central aperture.

The aperture 35 in the hook member 30 has flats 38 that are dimensioned to receive the flats 58 of the pivot bolt 51. However, the apertures 45a, 45b in the components of the blade member 40 are dimensioned so that the flatted shank 52 of the pivot bolt 51 can freely rotate. There literally should be some clearance between the shank 52 of the pivot bolt 51 and the apertures 45a, 45b. Consequently, when fully assembled, the pivot bolt 51 is locked to and rotates only with the hook member 30, and not with the blade member 40. If viewed the other way, the blade member 40 rotates freely, without rotating the pivot bolt 51 or the hook member 30.

Locking the hook member 30 to the pivot bolt 51 provides several advantages. First, it allows for the use of a smooth-headed pivot bolt 51 having an aesthetically pleasing look. The head can be flat or possibly even have a spherical recess. It also makes it possible to hold the pruning tool 10 by the hook member 30, and its associated handle 91, and then undo the nut 57 with only one wrench.

Moreover, the blade member 40 does not rotate directly on the shaft 52 of the pivot bolt 51. Instead, the blade member 40 rotates between the pivot bolt's spherical head 59 and the planar cutting surface 37 of the hook member 30. The spherical head 59 serves as a ball joint, pressing the blade member 40 firmly against the hook member while allowing the blade member 40 some latitude during rotation. The result is that the planar cutting surfaces 37, 47 are held tightly in contact with one another throughout rotation. While it is not the intended mode of operation, the pruning tool 10 would still be operable even if the pivot bolt assembly 50 became loose, but with the blade member 40 rotating on the pivot bolt 51 to some degree.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A hand-held pruning tool comprising:

a pruning head having a cutting end and a handle end;

a tapered shaft extending reducingly away from the handle end of said pruning head to a distal end;

a threaded stud at the distal end of said tapered shaft;

a wedge member having an exterior, a top end with a top aperture, a bottom end with a bottom aperture, and a tapered interior extending reducingly away from the top end toward the bottom end, said wedge member surrounding said tapered shaft with said threaded stud extending through the bottom aperture of said wedge member, the tapered interior of said wedge member slidable upwardly and downwardly along said tapered shaft, the exterior of said wedge member being expandable outward as the tapered interior of said wedge member slides upward on said tapered shaft;

a nut that mates with said threaded stud and contacts the bottom end of said wedge member to slide said wedge member along said tapered shaft and adjust a relative position between the tapered interior of said wedge member and said tapered shaft; and a hollow handle having an interior which receives said tapered shaft, said threaded stud, said wedge member, and said nut, the interior of said hollow handle surrounding and engaging the exterior of said nut and the exterior of said wedge member, said hollow handle being rotatable to simultaneously rotate said nut and said wedge member to move said nut on said threaded stud and adjust the relative position between the tapered interior of said wedge member and said tapered shaft and adjust the exterior of said wedge member relative to the interior of said hollow handle to form a tight fit between said tapered shaft, said wedge member, and said hollow handle.

2. The pruning tool of claim 1 further comprising:

means for preventing said hollow handle from rotating after forming the tight fit.

3. The hand-held pruning tool of claim 2 wherein said means for preventing said hollow handle from rotating comprises:

an aperture formed transversely through said tapered shaft;

opposing holes transversely formed in said hollow handle, said opposing holes aligning with said aperture; and a screw fastener passing through one of said opposing holes, through said aperture, and out the other of said holes.

4. The hand-held pruning tool of claim 1 further comprising:

a flange integral with said cutting head, said flange formed at the handle end of said cutting head, said flange having a flat bottom end and a side periphery, said tapered shaft extending from a central portion of the flat bottom end of said flange.

5. The hand-held pruning tool of claim 4 further comprising:

a ferrule having an aperture which closely receives an uppermost portion of said tapered shaft, said ferrule having a lower portion with a side periphery that closely conforms with the interior of said hollow handle to minimize movement of said hollow handle relative to said tapered shaft.

6. The hand-held pruning tool of claim 5 wherein said ferrule further comprises a larger upper portion sandwiched between an end of said hollow handle and said flange to further minimize movement of said hollow handle relative to said tapered shaft.

7. The hand-held pruning tool of claim 1 wherein said wedge member, said nut, and said hollow handle are elliptical in cross-section.

8. The hand-held pruning tool of claim 1 wherein said threaded stud is integral with said tapered shaft.

9. The hand-held pruning tool of claim 1 wherein said threaded stud is separably fastenable to said tapered shaft.

10. The hand-held pruning tool of claim 9 wherein said separably fastenable threaded stud is comprised of a threaded lower portion and smooth upper portion and wherein said tapered shaft is comprised of an end aperture for receiving the smooth upper portion of said threaded stud.

11. The hand-held pruning tool of claim 10 further comprising:

a transverse aperture through the smooth upper portion of said threaded stud;

opposing holes transversely formed in said tapered shaft and through the end aperture; and a roll pin inserted through one of said opposing holes, through said transverse aperture of said threaded stud, and out the other of said opposing holes.

12. The hand-held pruning tool of claim 1 wherein said wedge member comprises two identical interconnected halves.

13. The hand-held pruning tool of claim 12 wherein said wedge member comprises means for securing said nut to said wedge member so that rotation of said hollow handle and said nut will push said wedge member upward along said tapered shaft when rotated in a first direction and pull said wedge member downward along said tapered shaft when rotated in a second opposite direction.

14. The hand-held pruning tool of claim 12 wherein said means for securing said nut to said wedge member is comprised of a compartment formed between said identical interconnected halves, said compartment having an aperture on either end thereof for passage of said threaded stud.

15. A hand-held tool comprising:

a tool head with a tapered shaft;

an expandable sleeve with a through hole having a tapered interior, said expandable sleeve's tapered interior slidably surrounding the tapered shaft with a larger end of said expandable sleeve's tapered interior facing a larger end of the tapered shaft;

a hollow handle rotatably surrounding said tool head's tapered shaft and said expandable sleeve; and means for sliding said expandable sleeve inside of said hollow handle and along said tool head's tapered shaft toward the larger end thereof in response to a rotation of said hollow handle to expand said expandable sleeve between the tapered shaft and said hollow handle to form a tight fit.

16. The hand-held tool of claim 15 further comprising:

means for preventing said hollow handle from rotating after forming the tight fit.

17. The hand-held tool of claim 15 wherein said tool head is a pruning head.

18. The hand-held tool of claim 15 wherein said expandable sleeve comprises:

a wedge member having an exterior, a top end with a top aperture, and a bottom end with a bottom aperture, the tapered interior extending reducingly away from the top end toward the bottom end, said wedge member surrounding said tapered shaft.

19. The hand-held tool of claim 18 wherein said moving means comprises:

a threaded stud located at a distal end of said tapered shaft, said threaded stud protruding through the bottom aperture of said wedge member when said wedge member surrounds said tapered shaft; and a threaded nut engaging said threaded stud and contacting the bottom end of said wedge member, said hollow handle physically engaging said threaded nut during rotation.

* * * * *